(12) United States Patent
Hendriks et al.

(10) Patent No.: US 7,342,725 B2
(45) Date of Patent: Mar. 11, 2008

(54) VARIABLE REFRACTIVE SURFACE

(75) Inventors: Bernardus Hendrikus Wilhelmus Hendriks, Eindhoven (NL); Stein Kuiper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 273 days.

(21) Appl. No.: 10/556,244

(22) PCT Filed: May 10, 2004

(86) PCT No.: PCT/IB2004/050620

§ 371 (c)(1), (2), (4) Date: Nov. 10, 2005

(87) PCT Pub. No.: WO2004/102252

PCT Pub. Date: Nov. 25, 2004

(65) Prior Publication Data

US 2007/0030553 A1    Feb. 8, 2007

(30) Foreign Application Priority Data

May 14, 2003   (EP) ................................ 03101349

(51) Int. Cl.
G02B 1/06 (2006.01)
(52) U.S. Cl. ....................................... 359/666; 359/665
(58) Field of Classification Search ................ 359/665, 359/666
See application file for complete search history.

(56) References Cited

U.S. PATENT DOCUMENTS

| 6,369,954 B1 | 4/2002 | Berge et al. |
| 2002/0159156 A1 | 10/2002 | Wohlstadter et al. |
| 2004/0174610 A1* | 9/2004 | Aizenberg et al. .......... 359/665 |

FOREIGN PATENT DOCUMENTS

| EP | 1168055 | 1/2002 |
| EP | 1293807 | 3/2003 |

* cited by examiner

*Primary Examiner*—Ricky Mack
*Assistant Examiner*—William C Choi
(74) *Attorney, Agent, or Firm*—Michael E. Belk

(57) ABSTRACT

An optical element (200; 300) for providing a variable refractive surface. The element comprises a chamber (215) defined by at least one side wall (270), with an optical axis (90) extending through the chamber (215). The chamber (215) contains a first fluid (220) and a second fluid (230) in contact over a meniscus (225) extending transverse the optical axis (90). The perimeter of the meniscus (225) is constrained by said side wall (270). The fluids (220, 230) are substantially immiscible and have different indices of refraction. A first electrowetting electrode (242; 243) is arranged to act on at least a portion of the meniscus perimeter constrained by said side wall (270). A second electrowetting electrode (280) extends through the meniscus (225).

13 Claims, 4 Drawing Sheets

VARIABLE REFRACTIVE SURFACE

FIELD OF THE INVENTION

The present invention relates to an element providing a variable refractive surface, to devices including such elements, and to methods of manufacture of such elements and such devices. Such an element is particularly suitable for, but not limited to, correcting spherical aberrations within optical scanning devices.

BACKGROUND OF THE INVENTION

In various optical systems, aberrations can arise which are unwanted, and which tend to decrease the performance of the optical system.

For instance, optical discs such as CD (Compact Disc), DVD (Digital Video Disc or Digital Versatile Disc), and BD (Blu-ray Disc) are known as information recording media on which information is optically recorded or reproduced. Warped optical discs result in coma aberration in the scanning beam, thus deteriorating the readout signal of the optical recording system. Further, the system may be effected by temperature changes e.g. the objective lens in optical recording systems can give rise to spherical aberration when its temperature is elevated, thus leading to deterioration of the readout signal.

Some optical discs have two or more information layers. When switching from scanning one information layer to another information layer (e.g. from the first to the second layer in a dual layer disc), spherical aberration arises due to the different covering layer thicknesses that have to be traversed by the scanning beam. Such spherical aberration has to be corrected in order to be able to accurately read both information layers.

A known technique for compensating for such unwanted aberrations is to provide a switchable liquid crystal cell within the beam path. The cell is arranged to show a variable amount of spherical aberration, the amount of spherical aberration be controlled by applying a voltage to the cell. EP 1,168,055 describes such an aberration correction device. One disadvantage of such a liquid crystal device is that it requires a relatively expensive liquid crystal cell.

It is an aim of embodiments of the present invention to provide an optical element that addresses one or more problems of the prior art, whether referred to herein or otherwise.

It is an aim of particular embodiments of the present invention to provide a relatively cheap optical element that is suitable for correcting spherical aberration.

STATEMENTS OF THE INVENTION

In a first aspect, the present invention provides an optical element for providing a variable refractive surface, the element comprising:
a chamber defined by at least one side wall;
an optical axis extending through the chamber;
the chamber containing a first fluid and a second fluid in contact over a meniscus extending transverse the optical axis, the perimeter of the meniscus being constrained by said side wall, the fluids being substantially immiscible and having different indices of refraction;
a first electrowetting electrode arranged to act on at least a portion of the meniscus perimeter constrained by said wall; and
a second electrowetting electrode extending through the meniscus.

In such an element, the shape of the meniscus may be altered by both electrodes. The meniscus effectively provides a refractive surface, the shape of which is variable. Use of the electrode extending through the meniscus allows the meniscus to be formed into a number of novel shapes, including shapes suitable for correcting spherical aberration. Such an element is relatively cheap to manufacture compared to a liquid crystal cell.

In another aspect, the present invention provides a device comprising an optical element for providing a variable refractive surface, the element comprising: a chamber defined by at least one side wall; an optical axis extending through the chamber; the chamber containing a first fluid and a second fluid in contact over a meniscus extending transverse the optical axis, the perimeter of the meniscus being constrained by said side wall, the fluids being substantially immiscible and having different indices of refraction; a first electrowetting electrode arranged to act on at least a portion of the meniscus perimeter constrained by said side wall; and a second electrowetting electrode extending through the meniscus.

In a further aspect, the present invention provides a method of manufacturing an optical element for providing a variable refractive surface, the element comprising: providing a chamber defamed by at least one side wall, with an optical axis extending through the chamber; filling the chamber with a first fluid and a second fluid such that the fluids are in contact over a meniscus extending transverse the optical axis, the perimeter of the meniscus being constrained by said side wall, the fluids being substantially immiscible and having different indices of refraction; providing a first electrowetting electrode arranged to act on at least a portion of the meniscus perimeter constrained by said wall; and providing a second electrowetting electrode extending through the meniscus.

In another aspect, the present invention provides a method of manufacturing an optical device, the method comprising the step of: providing an optical element for providing a variable refractive surface, the element comprising: a chamber defined by at least one side wall; an optical axis extending through the chamber; the chamber containing a first fluid and a second fluid in contact over a meniscus extending transverse the optical axis, the perimeter of the meniscus being constrained by said side wall, the fluids being substantially immiscible and having different indices of refraction; a first electrowetting electrode arranged to act on at least a portion of the meniscus perimeter constrained by said side wall; and a second electrowetting electrode extending through the meniscus.

BRIEF DESCRIPTION OF DRAWINGS

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENT

The present inventors have realised that an electrowetting device having a meniscus between two fluids of different refractive indices can be used be provide aberration compensation.

Electrowetting devices are devices that utilise the electrowetting phenomenon to operate. In electrowetting, the three-phase contact angle is changed with applied voltage. The three-phases constitute two fluids and a solid. Typically, at least one of the fluids is a liquid.

A fluid is a substance that alters it shape in response to any force, that tends to flow or to conform to the outline of its chamber, and that includes gases, vapours, liquids and mixtures of solids and liquids capable of flow.

Figure 1:
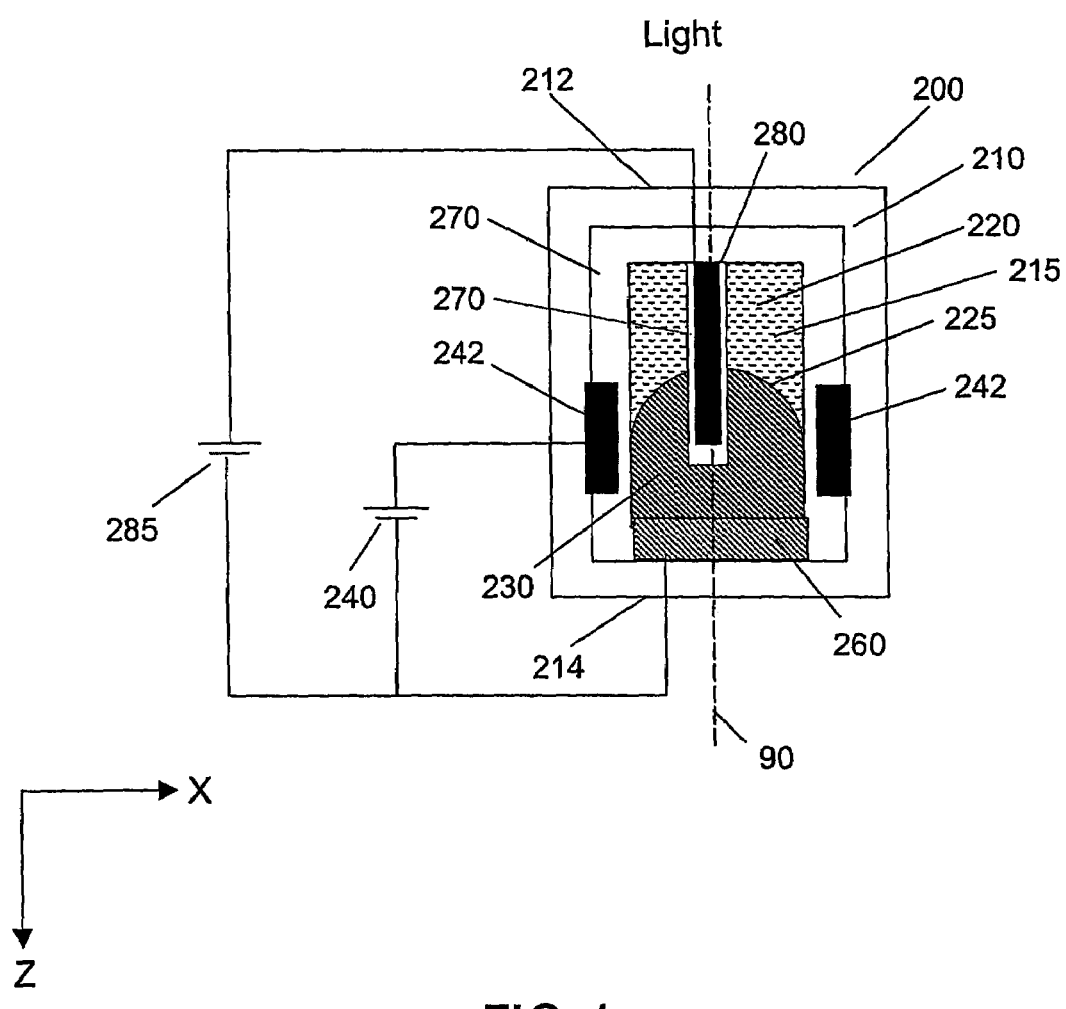
FIG. 1 illustrates a cross-sectional view of an optical element in accordance with a first embodiment of the present invention.

FIG. 1 illustrates an element 200 in accordance with an embodiment of the present invention. The element 200 is an optical element (i.e. it is arranged to alter the properties of light incident upon the device), and in this instance the element 200 is arranged to provide a variable refractive surface i.e. a refractive surface, the configuration (e.g. the shape, or the angle of inclination relative to the optical axis) of which can be varied.

The element 200 comprises a first fluid 220 and a second fluid 230, in contact over a meniscus 225, the two fluids being immiscible. The first fluid 220 is a non-conducting non-polar liquid, such as a silicone oil or an alkane. One example of such an oil is polydimethyl (8-12%)-phenylmethysiloxame copolymer, which has a refractive index n=1.425. The second fluid 230 is a conducting or polar liquid such as water containing a salt solution (or a mixture of water and ethylene glycol). Water typically has a refractive index n=1.334, but dissolution of salt may change this.

The two fluids 220, 230 are preferably arranged to have an equal density, so as to minimise the gravitational effects between the two liquids such that the lens functions independently of orientation. The two fluids 220, 230 have different refractive indices, such that the meniscus interface 225 between the two fluids will act as a refractive surface, refracting light incident upon the surface.

At least a portion of the meniscus 225 extends transverse the optical axis 90. The term transverse is not limited to the meniscus 225 being perpendicular to the optical axis 90, but simply indicates that the meniscus does not extend parallel to the optical axis 90.

Varying the shape of the meniscus 225 will vary the refractive function provided by the element 200. The shape of the meniscus 225 is adjusted by the electrowetting phenomenon, by applying a voltage between the annular electrode 242 extending around the periphery of the device and the electrode 260, and also by applying a voltage between the electrode 280 that extends through the meniscus 225, and the electrode 260. In this particular embodiment, the electrode 280 extends along the optical axis 90. Application of such voltages alters the contact angle of the meniscus 225 with the surface overlying the relevant electrode. Due to the configuration of the surfaces and the electrodes, meniscus shapes suitable for aberration correction may be provided.

So as to allow the transmission of light through the device, at least opposite faces of the device (in the orientation shown in the figure, top and bottom surfaces) are transparent. In this particular embodiment, the element has a chamber 215 with side walls in the form of a cylinder 210. Light can enter and exit the chamber 215 through the transparent ends 212, 214 of the cylinder. The fluids 220, 230 are enclosed within the sealed space or chamber 215 defined by the side walls of the cylinder 210. One end (the end of electrode 260) of the interior surface of the cylinder 210 is hydrophilic so as to attract the polar fluid 230. The remainder of the cylinder 210 (i.e. the opposite end, and the interior side walls) is coated with a hydrophobic coating 270. The electrode 280 and the coating 270 covering the electrode may both be transparent. Alternatively, at least one of the electrode 280 and the coating 270 has a light absorbing surface (e.g. black) to prevent optical artefacts e.g. the electrode refracting light.

The area of the electrode 260 in contact with fluid 230 may be formed entirely of a hydrophilic material, or alternatively coated with a hydrophilic layer (e.g. silicon dioxide or glass). The electrode 260 may be covered with a thin insulating layer, such that the electrode is capacitively coupled to the fluid 230.

In this particular embodiment, the hydrophilic area 260 of the interior surface is completely covered by a transparent hydrophilic conductor (e.g. Indium Tin Oxide), so as to form an electrode in conductive contact with the fluid.

By arranging for one area of the interior surface of the cylinder to be hydrophilic, with the remainder of the interior surface being hydrophobic, then it will be appreciated that in this two fluid system the stability of the device will be greatly enhanced. The polar fluid will not adhere to any portion of the interior surface where it is desired to have only the non-polar fluid, and vice versa.

It should be noted that this condition does not prohibit the polar fluid 230 being in contact with part of the hydrophobic coating 270. The purpose of the hydrophilic layer is to locate the polar fluid i.e. to keep the polar fluid in a desired position (with the position often defining at least in part the shape). Thus, a relatively small hydrophilic area may be suitable for this purpose. For instance, the whole of the interior surface of a device could be hydrophobic, apart from those areas in which it is necessary to keep the polar fluid(s) in a certain shape or position.

Electrowetting can be used to increase the wettability of a polar or conducting fluid on a surface. If this wettability is initially small (for a polar liquid this is usually termed a hydrophobic surface, e.g. a Teflon-like surface), a voltage can be used to make it larger. If the wettability is initially large (for a polar liquid this is usually called a hydrophilic surface, e.g. silicon dioxide) then applying voltage will have relatively little effect. It is therefore preferable that in electrowetting devices the three-phase line is initially in contact with a hydrophobic layer. It should be noted that the meniscus 225 is not in conductive contact with the electrodes 242 and 280, which are both separated from the fluids by an insulating covering layer.

It will be appreciated that the areas of different wettability can be formed entirely from a hydrophobic or a hydrophilic material. Alternatively, the areas can be formed by coating other materials with hydrophobic or hydrophilic substances e.g. by dip coating or by chemical vapour deposition.

Figure 2:
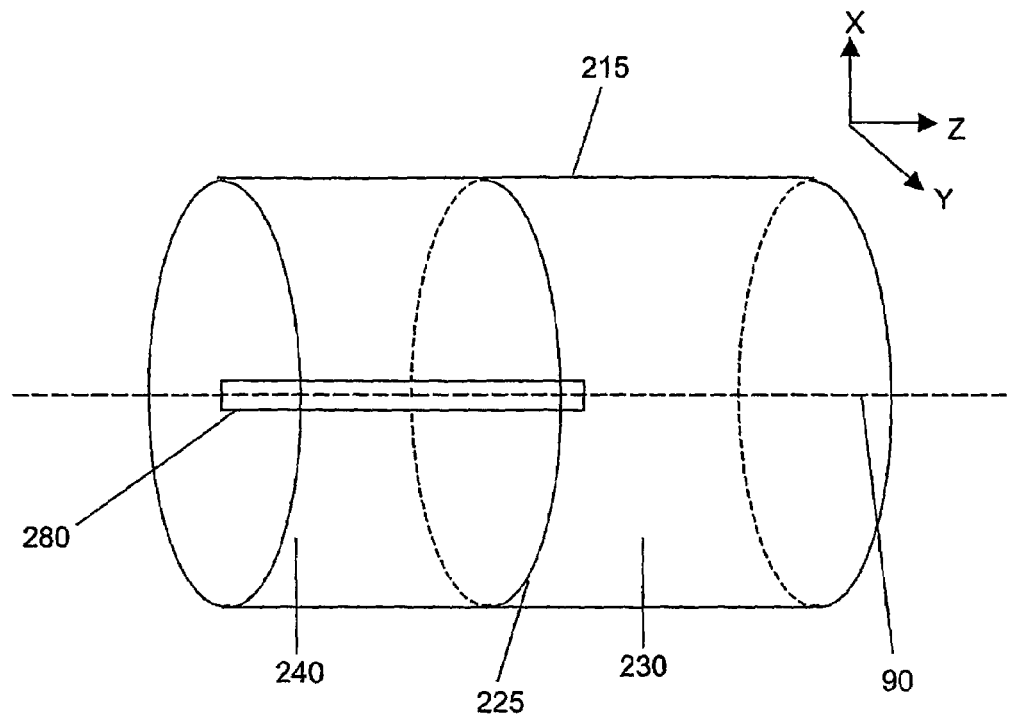
FIG. 2 illustrates a perspective view of the chamber of the element shown in FIG. 1.
Figure 3:
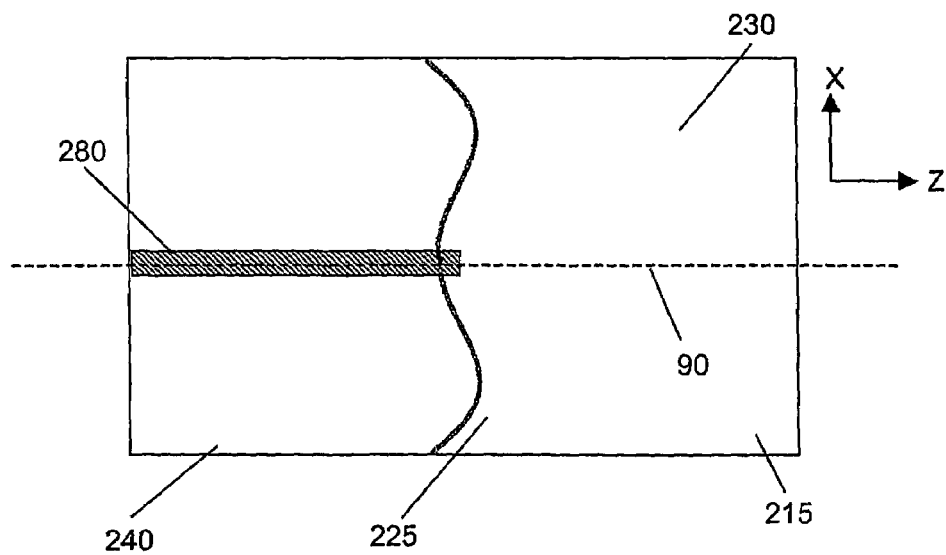
FIG. 3 illustrates a cross-sectional view of the chamber of the element shown in FIG. 1, illustrating one configuration of the meniscus.

FIGS. 2 and 3 illustrate different configurations of the meniscus 225.

The configurations are changed by utilising the electrowetting effect to change the contact angles the meniscus 225 makes with the surface surrounding the electrode 280, or the perimeter of the meniscus contacting the inner surface of the chamber 215.

In this particular embodiment, the element 200 is arranged (i.e. the fluids, surfaces of different wettability and voltage ranges selected) such that the element is switchable between two configurations, both of which provide no optical power (i.e. so the meniscus does not act as a lens). In both configurations, the central portion of the meniscus and the perimeter of the meniscus are at the same distance along the optical axis (i.e. in the same said position, as defined by the axis shown in the figures). In the configuration shown in FIG. 2, the meniscus is flat or planar, such that the meniscus does not introduce any aberration.

In the configuration shown in FIG. 3, the meniscus is donut shaped, and thus the wavefront distortion introduced by the meniscus is spherical aberration. Such spherical aberration can be applied to offset undesired spherical aberration.

It will be appreciated that the above embodiment has been provided by way of example only, and that various other configurations will be apparent to the skilled person. For instance, whilst the electrode 280 has been described as extending along the optical axis (and hence through the centre of the circular cylindrical chamber 215) the electrode could be positioned at any point within the chamber, as long as it extends through the meniscus 225.

Further, whilst the chamber has been described as being a circular cylinder, it will be appreciated that the chamber can in fact be of any desired shape. It may have a circular cross-section, or it may have any other desired cross-section, e.g. elliptical, square or rectangular.

Whilst the side walls of the chamber have been illustrated as being substantially parallel to the optical axis, it will be appreciated that the side walls can in fact take any desired shape, or be at any desired angle to the optical axis 90. For instance, in order to have a planar (or flat) meniscus without having to apply a voltage to the electrodes, the side walls of the chamber and the central electrode wall can be inclined at an angle to the optical axis (in other words, the chamber and the electrode 280 may be conical, or frusto-conical), in such a way that the contact angle of the meniscus with the side walls is initially in a plane perpendicular to the optical axis 90. It is also possible to make only the side walls of the chamber inclined. In this case a voltage to the central electrode has to be applied to have a flat meniscus.

In the above embodiment, the meniscus has been described as being switchable between two configurations. However, it will be appreciated that the meniscus may be switchable between any number of desired configurations. The meniscus configuration may be continuously variable. In the above embodiment, the meniscus has been described as being switchable between the two configurations, both of which provide no optical power. However, it will be appreciated that the meniscus may be switchable between configurations that have optical power, including the meniscus being switchable between a configuration that provides no optical power and a configuration that does have optical power.

In the above embodiment, a single electrode has been described as extending through the meniscus, and a single electrode acting on a perimeter of the meniscus. It will be appreciated that one or more of either electrodes may be provided.

Figure 4:
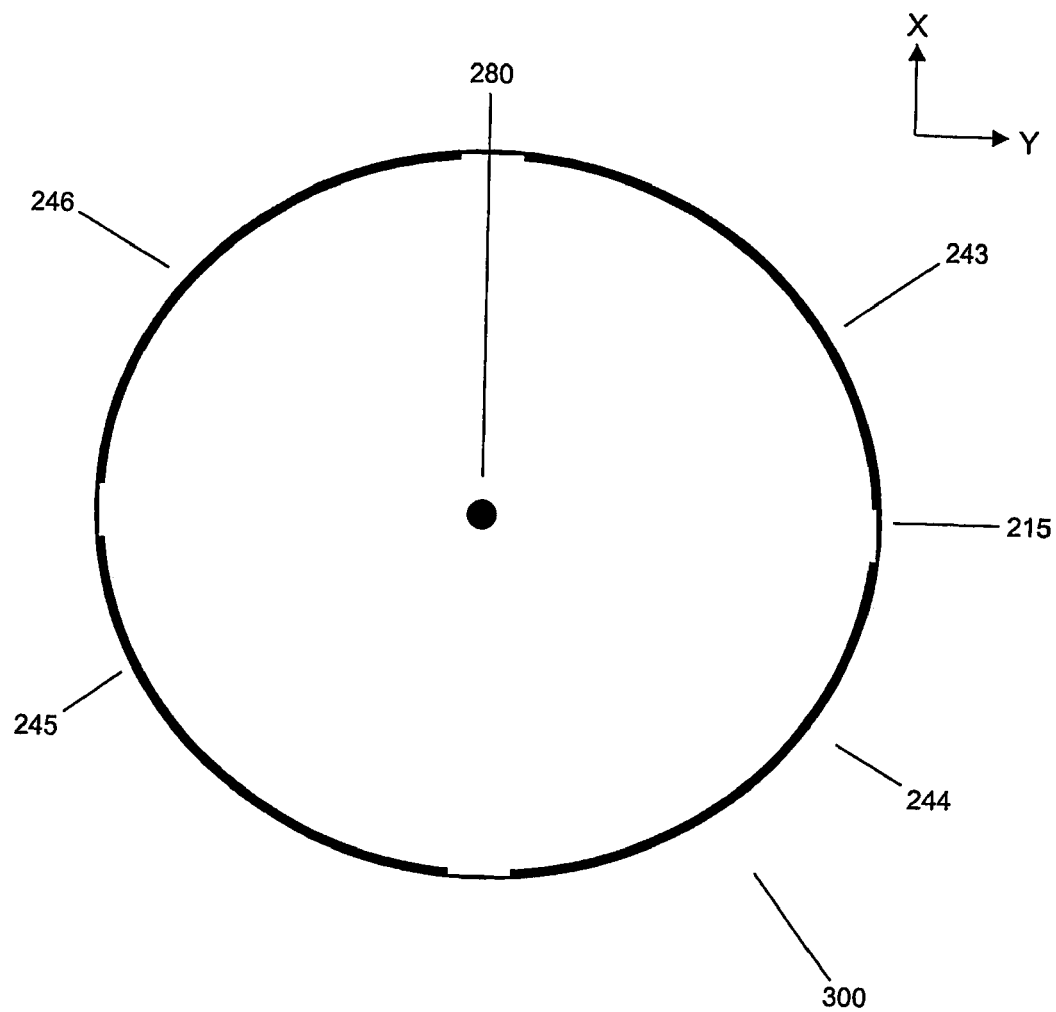
FIG. 4 illustrates a cross-sectional plan view of an element in accordance with a further embodiment of the present invention.

For instance, FIG. 4 illustrates a cross-sectional view of a further embodiment of the present invention, in which instead of a single annular electrode 242 extending around the periphery of the chamber 215, in this embodiment the element 300 comprises four separate electrodes 243, 244, 245, 246 spaced equally around the periphery of the chamber 215.

Such a configuration allows the meniscus to be configured to a variety of shapes, by applying different voltages to the different electrodes. For instance, if voltages are applied such that the contact angle at electrodes 244 and 246 is equal, but the contact angle at electrode 243 is more acute, and the contact angle at electrode 245 more obtuse, then the meniscus acquires a configuration which resembles that of a coma wavefront deformation, hence introducing coma.

Alternatively, if the perimeter of the meniscus overlying electrodes 244 and 246 has the same contact angle, whilst the meniscus overlying electrodes 243 and 245 has the same angle, but is at a different position along the Z-axis (i.e. along the optical axis 90), the meniscus 225 acquires a shape which resembles an astigmatic wavefront deformation, hence introducing astigmatism.

Thus, such an element 300 as illustrated in FIG. 4, can be used to produce a range of desired aberrations, to offset undesired aberrations, It will be appreciated that such elements can be incorporated into a range of optical devices.

Figure 5:
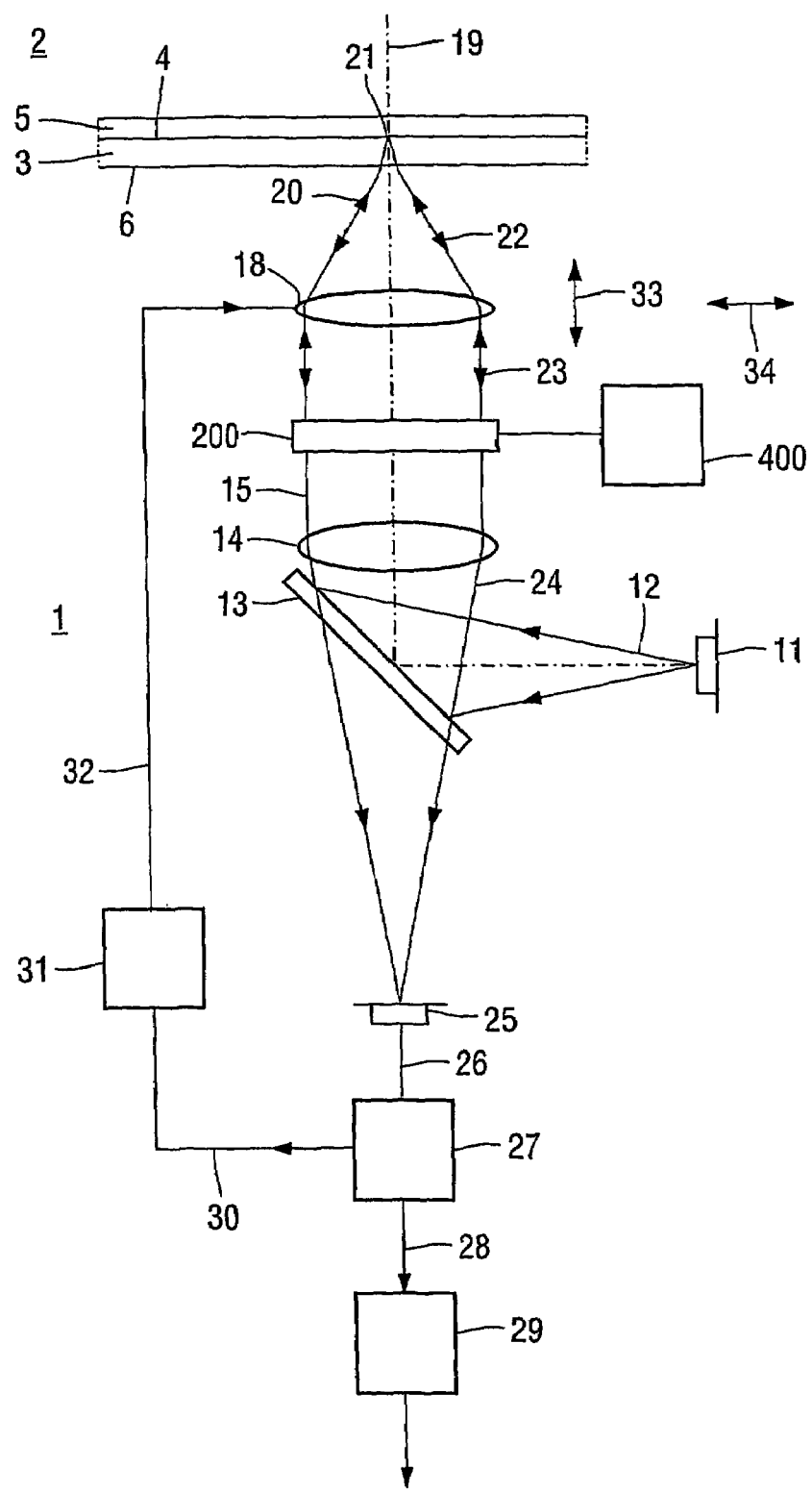
FIG. 5 illustrates a schematic representation of a device incorporating an element in accordance with an embodiment of the present invention.

FIG. 5 shows a device 1 for scanning an optical record carrier 2, including an objective lens 18. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4.

Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 5 in this particular embodiment is adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

In this particular embodiment, an element 200 is provided to provide spherical aberration compensation. The element 200 is located in the path of the beam, preferably between the collimator lens 14 and the objective system 18. However, if desired, the element 200 could be incorporated within the objective system 18 e.g. as an integral part of an objective lens. A meniscus control system 400 is provided to apply the correct voltages to the electrodes of the element 200, such that the element 200 provides the desired aspherical aberration compensation.

In another embodiment the element 200 is such that it also provides coma to compensate the coma arising due to disc tilt.

By providing an element as described above, a relatively cheap aberration (including aspherical aberration) compensation device may be provided to a range of optical systems, including optical scanning devices.

The invention claimed is:

1. An optical element (200; 300) for providing a variable refractive surface, the element comprising:
   a chamber (215) defined by at least one side wall (270);
   an optical axis (90) extending through the chamber (215);
   the chamber (215) containing a first fluid (220) and a second fluid (230) in contact over a meniscus (225) extending transverse the optical axis (90), the perimeter of the meniscus being constrained by said side wall (270), the fluids (220, 230) being substantially immiscible and having different indices of refraction;
   a first electrowetting electrode (242; 243) arranged to act on at least a portion of the meniscus perimeter constrained by said wall (270); and
   a second electrowetting electrode (280) extending through the meniscus (225).

2. An element as claimed in claim 1, wherein the second electrode (280) extends along the optical axis (90).

3. An element as claimed in claim 1, further comprising a voltage control system (240, 285; 400) for providing a voltage to said first electrowetting electrode (242, 243) and a voltage to said second electrowetting electrode (280) to form a predetermined meniscus configuration.

4. An element as claimed in claim 3, wherein a predetermined configuration comprises the meniscus (225) being substantially flat, and extending in a plane substantially perpendicular to the optical axis (90).

5. An element as claimed in claim 3, wherein a predetermined configuration comprises the meniscus (225) being non-planar, but with the perimeter of the meniscus (225) in contact with said side wall (270) being at substantially the same position along the optical axis (90) as the position at which the meniscus (225) contacts the second electrode (280).

6. An element as claimed in claim 1, wherein the element (300) further comprises at least a third electrowetting electrode (244, 245, 246) arranged to act on a portion of the perimeter of the meniscus separate from the portion of the meniscus acted upon by the first electrowetting electrode (243).

7. An element as claimed in claim 1, wherein at least one of said side walls (270) is inclined at an angle relative to the optical axis (90).

8. An element as claimed in claim 1, wherein the first and the second fluids (220, 230) have substantially the same density.

9. A device (1) comprising an optical element (200) for providing a variable refractive surface, the element comprising:
   a chamber (215) defined by at least one side wall (270);
   an optical axis (90) extending through the chamber (215);
   the chamber (215) containing a first fluid (220) and a second fluid (230) in contact over a meniscus (225) extending transverse the optical axis (90), the perimeter of the meniscus (225) being constrained by said side wall (270), the fluids (220, 230) being substantially immiscible and having different indices of refraction;
   a first electrowetting electrode (242; 243) arranged to act on at least a portion of the meniscus perimeter constrained by said side wall (270); and
   a second electrowetting electrode (280) extending through the meniscus (225).

10. A device as claimed in claim 9, wherein the device further comprises a meniscus control system (400).

11. A device (1) as claimed in claim 9, wherein the device is an optical scanning device for scanning an information layer (4) of an optical record carrier (2), the device comprising a radiation source (11) for generating a radiation beam (12, 15, 20) and an objective system (18) for converging the radiation beam on the information layer (4).

12. A method of manufacturing an optical element (200; 300) for providing a variable refractive surface, the method comprising:
   providing a chamber (215) defined by at least one side wall (270), with an optical axis (90) extending through the chamber (215);
   filling the chamber (215) with a first fluid (220) and a second fluid (230) such that the fluids (220, 230) are in contact over a meniscus (225) extending transverse the optical axis (90), the perimeter of the meniscus (225) being constrained by said side wall (270), the fluids (220, 230) being substantially immiscible and having different indices of refraction;
   providing a first electrowetting electrode (242; 243) arranged to act on at least a portion of the meniscus perimeter constrained by said wall (270); and
   providing a second electrowetting electrode (280) extending through the meniscus (225).

13. A method of manufacturing an optical device (1), the method comprising the step of:
   providing an optical element (200; 300) for providing a variable refractive surface, the element comprising:
   a chamber (215) defined by at least one side wall (270);
   an optical axis (90) extending through the chamber (215);
   the chamber (215) containing a first fluid (220) and a second fluid (230) in contact over a meniscus (225) extending transverse the optical axis (90), the perimeter of the meniscus (225) being constrained by said side wall (270), the fluids (220, 230) being substantially immiscible and having different indices of refraction;
   a first electrowetting electrode (242; 243) arranged to act on at least a portion of the meniscus perimeter constrained by said side wall (270); and
   a second electrowetting electrode (280) extending through the meniscus (225).

* * * * *